United States Patent [19]
Beckers

[11] 3,864,408
[45] Feb. 4, 1975

[54] METHYLENE CHLORIDE STABILIZED WITH METHYL ACETATE

[75] Inventor: Norman L. Beckers, Chardon, Ohio

[73] Assignee: Diamond Shamrock Corporation, Cleveland, Ohio

[22] Filed: Feb. 23, 1973

[21] Appl. No.: 335,364

[52] U.S. Cl............... 260/652.5 R, 134/31, 134/40, 252/171, 252/407
[51] Int. Cl...................... C07c 17/40, C07c 17/42
[58] Field of Search .......... 260/652.5; 252/120, 171

[56] References Cited
UNITED STATES PATENTS

| | | | |
|---|---|---|---|
| 3,060,125 | 10/1962 | Sims | 260/652.5 R |
| 3,285,857 | 11/1966 | Rathbone et al. | 260/652.5 R X |
| 3,326,988 | 6/1967 | Stack | 260/252.5 |
| 3,326,989 | 6/1967 | Cormany et al. | 260/652.5 R |
| 3,423,476 | 1/1969 | Patron | 260/652.5 |
| 3,670,036 | 6/1972 | Vivian | 260/652.5 R |

Primary Examiner—Howard T. Mars
Attorney, Agent, or Firm—William A. Skinner

[57] ABSTRACT

Methyl acetate and optionally propylene oxide in admixture with methylene chloride have been found to prevent degradation of methylene chloride in the presence of metals, metal halides, combinations thereof, and aromatic compounds, which react with methylene chloride in the presence of said metals, metal halides and combinations thereof. Reactions of aliphatic organic compounds with said metals, metal halides and combinations thereof to form products which result in deterioration of methylene chloride are also inhibited. A method for vapor degreasing metals by using the stabilized methylene chloride is described.

2 Claims, No Drawings

3,864,408

METHYLENE CHLORIDE STABILIZED WITH METHYL ACETATE

BACKGROUND OF THE INVENTION

Methylene chloride is a highly versatile and useful solvent for various industrial applications at both normal and elevated temperatures. A particularly important industrial use is the vapor degreasing of metals. Methylene chloride is known to be more stable than other chlorinated hydrocarbons solvents such as perchloroethylene, trichloroethylene and methyl chloroform when the solvents are used in unstabilized condition. For example, methylene chloride is more resistant to oxidation, hydrolysis and pyrolysis than other chlorinated solvents and does not substantially react with aluminum in the aluminum scratch test commonly used to indicate unstabilized or minimally stabilized methyl chloroform. In addition, methylene chloride may be used to greater advantage in vapor degreasing of metals than other known degreasing solvents since it may be used effectively at lower temperatures due to its lower boiling point and excellent stability. Methylene chloride is particularly desirable for such degreasing operations since it is substantially resistant to photochemical activity and therefore does not contribute to air pollution by smog formation. However, methylene chloride when used in various metal cleaning functions, including vapor degreasing, suffers the disadvantage of being reactive with aromatic compounds in the presence of metals, metal halides and combinations thereof, including aluminum, zinc and iron, halides thereof, and combinations of said metals and halides which react with the methylene chloride to produce hydrochloric acid and objectionable high boiling tarry substances which render the methylene chloride unsuitable for further use. The entire reaction of methylene chloride in the presence of aromatic compounds is not completely understood but is believed to be a condensation reaction catalyzed by metal, metal halides or combinations thereof. Thus, the aromatic compound reaction with methylene chloride is believed to be catalyzed, or initiated and catalyzed by the presence of metals such as aluminum, zinc, iron and the like, halides of said metals and combinations of said metals and halides. Such reactions are thought to be of the nature of a Friedel-Craft type reaction. Methylene chloride also disadvantageously suffers degradation by reaction of aliphatic organic compounds such as trans-dichloroethylene, 1,1,1-trichloroethane and carbon tetrachloride with said metals, metal halides and combinations thereof. The reaction products are colored tar-like masses which render the methylene chloride unsuitable for use as a solvent, particularly in vapor degreasing of metals. Aromatic and aliphatic organic compounds of this nature and metals such as aluminum, iron and zinc, their halides and combinations are generally introduced into the methylene chloride from various cutting oils and lubricants used in metal fabricating operations which are carried over into the methylene chloride solvent during vapor degreasing or other cleaning of the fabricated metal parts. Solvent manufacturing, handling and storage equipment is another source for introduction of such impurities. To prevent degradation and other types of deterioration such as oxidation, hydrolysis and pyrolysis which may occur in some instances, it has been the practice to incorporate minor quantities of various organic compounds into methylene chloride, which compounds act as stabilizers to substantially prevent such degradation. It is desirable to provide methylene chloride stabilized to effectively prevent degradation in various applications, and the demand still exists for a low cost stabilized methylene chloride composition that can be easily prepared and which provides optimum stabilization under many different operating conditions.

SUMMARY OF THE INVENTION

An object of this invention is to prevent deterioration or degradation of methylene chloride in association with metals, metal halides and combinations including aluminum and/or aluminum chloride, and an aromatic compound capable of reacting with methylene chloride in the presence of said metals, metal halides and combinations.

Another object of this invention is to prevent deterioration or degradation of methylene chloride in association with metals, metal halides and combinations including aluminum, iron and zinc, halides of said metals and an aliphatic organic compound capable of reacting with these metals, metal halides and combinations thereof in the presence of methylene chloride.

A further object of this invention is to provide a stabilized methylene chloride composition in which the stabilizers are low in cost and capable of being incorporated with ease into the methylene chloride.

A still further object of this invention is to provide a process for the degreasing of metals by contacting the metals with methylene chloride stabilized to prevent degradation of the methylene chloride in the presence of metals, metal halides and combinations thereof including aluminum, iron and zinc, halides of said metals and combinations and aromatic compounds which react with the methylene chloride in the presence of said metals, metal halides and combinations thereof.

Still another object of this invention is to provide a process for the degreasing of metals by contacting the metals with methylene chloride stabilized to prevent degradation of the methylene chloride in the presence of an aliphatic organic compound which reacts with metals including aluminum, iron, zinc and the like, halides of said metals and combinations of the individual metals and salts thereof.

These and additional objects of the present invention will become apparent to those skilled in the art from the description and claims which follow.

DESCRIPTION OF THE PREFERRED EMBODIMENTS

The objects set forth above have been found to be attained by providing a composition consisting essentially of methylene chloride containing stabilizing amounts of from about 0.05 to about 2.0 percent by weight of the methylene chloride of methyl acetate and optionally propylene oxide.

The quantity of the stabilizing agents useful in the practice of this invention will vary depending upon the conditions of use, the identity and quantity of other stabilizers incorporated into the methylene chloride and other practical operating considerations. Each stabilizing agent or compound may generally be used within the range of from about 0.05 to about 2.0 percent and preferably from about 0.10 to about 1.0 percent by weight of the methylene chloride. Although higher concentrations may be used, if desired, no additional benefit is obtained and the cost is unnecessarily increased. While the above composition containing stabilizing agents prevents degradation of the methylene chloride under a variety of operating conditions it is also possible to stabilize methylene chloride by deleting the propylene oxide depending on the stabilization required for the particular operating condition.

The stabilized composition may be used for the degreasing of metals by contacting the metals with the stabilized composition. It is also possible to use the stabilized methylene chloride composition for degreasing metals by deleting the propylene oxide. Thus, the process for vapor degreasing metals comprises contacting the metals to be degreased with the above described stabilized methylene chloride compositions wherein the methylene chloride contains either methyl acetate only or an admixture of stabilizing amounts of methyl acetate and propylene oxide.

In degreasing metals with the above described preferred stabilized methylene chloride in the presence of an aromatic compound which reacts with methylene chloride in the presence of metals, metal halides and combinations thereof including aluminum, iron, zinc, halides of said metals and combinations, there exists upon contact of the metal with the stabilized methylene chloride a composition comprising methylene chloride, a stabilizing amount of from about 0.05 to about 2.0 weight percent of the methylene chloride of methyl acetate, optionally from 0.05 to about 2.0 percent by weight of propylene oxide, and an organic compound which reacts with methylene chloride in the presence of said metals, metal halides and combinations. The metals, metal halides and combinations may be present from any source such as chloride formed by drilling or other machining of aluminum or aluminum-containing materials with various working fluids such as cutting oils, lubricants and the like, or aluminum chloride may be present from the reaction of methylene chloride with aluminum. The reactive aromatic compounds include toluene, mesitylene, naphthalene, and the like. The reaction of methylene chloride in the presence of aliphatic organic compounds such as trans-dichloroethylene, carbon tetrachloride and 1,1,1-trichloroethane, metals, metal halides and combinations may also be inhibited by methylene chloride stabilized with the same amounts of methyl acetate and optionally propylene oxide as above described.

In order that those skilled in the art may readily understand the present invention and certain specific embodiments by which it may be carried into effect the following illustrative examples are presented.

In Examples 1 and 2, respectively, of Table I, 15 ml of substantially water free methylene chloride stabilized with 0.8 wt. percent of methyl acetate respectively, were placed in glass vials containing a 1 $cm^2$ aluminum coupon 1/64 inch thick. The vials were tightly capped and allowed to stand at ambient conditions. After 16 hours no changes had taken place in the appearance of the solvent, the pH or the aluminum in each vial. Toluene in an amount of 5% by volume and about 0.04 grams of anhydrous aluminum chloride were then added to each vial, the contents stirred, changes in the contents recorded, and the vials loosely capped and allowed to stand. After four hours and after twenty-two hours changes in the appearance of the aluminum coupons and the solvents, and relative pH values of the solvents were recorded. The procedure of Examples 1 and 2 was followed in Examples 3 to 7 of Table I. In the latter Examples various compounds reported in the prior literature to be useful in stabilizing chlorinated solvents were evaluated for their ability to stabilize methylene chloride. In Examples 3 to 7 after the tightly capped vials had been standing for 16 hours no changes had occurred in the appearance of the solvent, the pH or the aluminum coupons. The results of the tests of Examples 1 to 7 are set forth in Table I.

From Table I it will be readily observed that after four hours the methylene chloride without methyl acetate had undergone a degradation reaction resulting in a dark orange coloration, evolvement of hydrogen chloride gas and complete loss of utility of the solvent. Examples 3 to 7 inclusive of Table I show that various compounds frequently used as solvent stabilizers are not as effective as methyl acetate in inhibiting degradation of methylene chloride by reaction of aromatic compounds with methylene chloride in the presence of metals, metal salts and combinations thereof.

TABLE I

INHIBITION OF REACTION OF AROMATIC COMPOUNDS WITH METHYLENE CHLORIDE

| Example No. | Solvent System | Upon Addition of 5% Vol. Toluene and 0.04 grams Aluminum Chloride | after 4 Hours | After 22 Hours |
|---|---|---|---|---|
| 1 | Methylene Chloride Containing Aluminum Coupon | Light Yellow Precipitate | Dark Orange pH<3 HCl fumes | No change |
| 2 | Methylene Chloride Containing Aluminum Coupon Stabilized With 0.8 Wt. % Methyl Acetate | Very Slight Yellow Precipitate | Very slight White Precipitate, Colorless pH about 4.5 | No change |
| 3 | Methylene Chloride Containing Aluminum Coupon Stabilized With 2.8 Wt. % Dimethoxymethane | Solution light brown Purple Precipitate Turned purple-brown after a few minutes | Solution light gray-tan Brown spots on Aluminum Coupon Grey-white Precipitate pH<3 | No change |

TABLE I—Continued

INHIBITION OF REACTION OF AROMATIC COMPOUNDS WITH METHYLENE CHLORIDE

| Example No. | Solvent System | Upon Addition of 5% Vol. Toluene and 0.04 grams Aluminum Chloride | after 4 Hours | After 22 Hours |
|---|---|---|---|---|
| 4 | Methylene Chloride Containing Aluminum Coupon Stabilized With 0.7 Wt.% Methyl Butynol | Solution Dark Purple Colored | Solution Purple-black and Precipitate Present pH about 3.5 | Black Precipitate Solution Yellow-Green pH about 4.5 |
| 5 | Methylene Chloride Containing Aluminum Coupon Stabilized With 2.8 Wt. % 1,1-Dimethoxyethane | Light Lavender Precipitate | Solution Dark Gray And Precipitate Present pH about 3 | pH about 4.5 |
| 6 | Methylene Chloride Containing Aluminum Coupon Stabilized With 2.0 Wt. % 1,3-Dioxolane | Yellow Green Precipitate | Yellow Precipitate On Aluminum Coupon Solution Green-Gray pH about 3.5 | White Precipitate Solution Yellow pH about 4.5 |
| 7 | Methylene Chloride Containing Aluminum Coupon Stabilized With 0.8 Wt. % 1,4-Dioxane | Red Precipitate | Orange Precipitate On Aluminum Coupon Solution Colorless pH about 4.0 | Pink-Brown Precipitate Solution Colorless pH about 4.5 |

In Examples 8 and 9 of Table II, below, an aluminum reflux stability test was carried out by placing about 190 ml of substantially water free methylene chloride in a flat bottom 300 ml boiling flask fitted with a condenser. An aluminum coupon about 1½ × 9 cm was partially inserted in the liquid in the flask. During the extended period of reflux the solvent vapor surrounded, condensed, and dripped from the exposed portion of the strip. In Example 8 about 200 ml of methylene chloride containing the aluminum coupon and 1,1,1-trichloroethane was refluxed and in Example 9 about 190 ml of methylene chloride containing the aluminum coupon was refluxed with 1,1,1-trichloroethane and methyl acetate.

In Examples 8 and 9 a commercially available stabilized vapor degreasing grade of 1,1,1-trichloroethane was added to the methylene chloride. The results of these tests are shown in Table II below.

In Example 8 deterioration of the solvent system occurred due to the reaction of aluminum with the contained 1,1,1-trichloroethane. In Example 9 the addition of methyl acetate to this solvent system prevented such deterioration.

The inhibition of the degradation of methylene chloride by the reaction between 1,1,1-trichloroethane and aluminum and metal salts by methyl acetate is especially surprising and unexpected when it is realized that the stabilizers included in the commercial vapor degreasing grade 1,1,1-trichloroethane to prevent reaction of the 1,1,1-trichloroethane with metals and/or metal salts in the presence of chlorinated solvents failed to inhibit the degradation of the methylene chloride. Only when the methyl acetate was admixed with the methylene chloride containing the stabilized 1,1,1-trichloroethane was degradation of the methylene chloride prevented.

TABLE II

| Example | Solvent System | Volume, Additive | Days Reflux | pH | Acid as ppm HCl | Condenser Coupon Corrosion | Color of Solvent |
|---|---|---|---|---|---|---|---|
| 8 | Methylene Chloride | 5% 1,1,1-Trichloroethane | ⅓ | <3 | HCl fumes | Severe | Black |
| 9 | Methylene Chloride plus 0.25% by wt. methyl acetate | 5% 1,1,1-Trichloroethane | 20 | 7.0 | 0 | None | Clear and Very Light Gray |

*Determined by visual observation.

In Examples 10 to 15 of Table III, below, the aluminum reflux stability tests consisted of placing 200 ml of methylene chloride in a 300 ml flask, adding about 0.5 grams of 20 mesh aluminum and suspending a bright aluminum coupon about 2 × 7 cm. in a condenser fitted to the flask. Mehtylene chloride and the solvent containing durene, mesitylene and combinations of mesitylene with methyl acetate and propylene oxide and with only methyl acetate were refluxed for varying time periods. In all the tests the pH and acid content, as HCl, were determined and visual observation of the aluminum condenser coupon made at the completion of the test. The results of these tests are set forth in Table III below.

TABLE III

EFFECT OF AROMATIC COMPOUNDS ON ALUMINUM REFLUX STABILITY TESTS WITH METHYLENE CHLORIDE

| Example | Solvent System | Volume Additive | Days Test | pH | Acid as ppm HCl | Color Solvent | Condenser Coupon Corrosion |
|---|---|---|---|---|---|---|---|
| 10 | Methylene Chloride | 0 | 3 | 7.0 | None | Clear and Colorless | Blisters |
| 11 | Methylene Chloride | 5% Mesitylene (Trimethyl Benzene) | 5 | <3 | HCl fumes | Orange-Black | General Severe |
| 12 | Methylene Chloride + 0.25 wt. % Methyl Acetate | 5% Mesitylene | 14 | 4.8 | — | Clear Colorless | None |
| 13 | Methylene Chloride + 0.25 Wt. % Methyl Acetate + 0.50 Wt. % Propylene Oxide | 5% Mesitylene | 28 | 7.0 | None | Clear, Gray | None |
| 14 | Methylene Chloride | 5% Durene (Tetramethyl Benzene) | 5 | — | — | Pink | Purple Blisters |
| 15 | Example 14 after one additional day of reflux. | 5% Durene | 6 | 5.4 | 108 | Yellow, turbid | General Severe |

The tests in both Tables II and III were conducted by venting the condenser to room air and without the addition of water. Also in Tables II and III the pH determinations were made with a portion of the water-layer obtained by extraction of the solvent with water equal to the volume of the solvent system.

Table III illustrates the prevention of degradation of methylene chloride by methyl acetate in the presence of aluminum and the aromatic compound mesitylene in Example 12, and by the combination of methyl acetate and propylene oxide in the presence of mesitylene (trimethyl benzene) and aluminum in Example 13.

Examples 14 and 15 show degradation of methylene chloride in the presence of another aromatic compound, durene (tetramethyl benzene) when refluxed with aluminum.

Although the present invention has been described with detailed reference to specific embodiments thereof, it is not intended to be so limited since modifications and alterations may be made therein which are within the complete intended scope of this invention as defined by the appended claims.

What is claimed is:

1. A stabilized methylene chloride composition consisting essentially of methylene chloride and stabilizing amounts of from about 0.05 to about 2.0 percent by weight of the methylene chloride of each of methyl acetate and propylene oxide.

2. The composition of claim 1 wherein from about 0.10 to about 1.0 percent by weight of each of methyl acetate and propylene oxide is present.

* * * * *